US012085485B2

(12) United States Patent
Van Vlierberghe

(10) Patent No.: US 12,085,485 B2
(45) Date of Patent: Sep. 10, 2024

(54) SYSTEM AND A METHOD FOR ANALYZING THE MOTIONS OF A MECHANICAL STRUCTURE

(71) Applicant: Siemens Industry Software NV, Leuven (BE)

(72) Inventor: Pieter Van Vlierberghe, Kessel-lo (BE)

(73) Assignee: Siemens Industry Software NV, Leuven (BE)

( * ) Notice: Subject to any disclaimer, the term of this patent is extended or adjusted under 35 U.S.C. 154(b) by 0 days.

(21) Appl. No.: 18/573,611

(22) PCT Filed: May 23, 2022

(86) PCT No.: PCT/EP2022/063876
§ 371 (c)(1),
(2) Date: Dec. 22, 2023

(87) PCT Pub. No.: WO2022/268420
PCT Pub. Date: Dec. 29, 2022

(65) Prior Publication Data
US 2024/0264032 A1    Aug. 8, 2024

(30) Foreign Application Priority Data
Jun. 25, 2021   (EP) ..................... 21181864

(51) Int. Cl.
*G01M 7/02*    (2006.01)
*G01C 25/00*   (2006.01)

(52) U.S. Cl.
CPC ........... *G01M 7/025* (2013.01); *G01C 25/005* (2013.01)

(58) Field of Classification Search
CPC .. G01M 7/025; G01M 7/0066; G01C 25/0005
(Continued)

(56) References Cited

U.S. PATENT DOCUMENTS

| 6,128,955 A | 10/2000 | Mimura |
| 7,657,394 B1 | 2/2010 | Slavik |

(Continued)

FOREIGN PATENT DOCUMENTS

| EP | 3073226 A1 * | 9/2016 | ........... G01C 25/005 |
| WO | 2019224277 A1 | 11/2019 | |

OTHER PUBLICATIONS

International Preliminary Report on Patentability for International App. PCT/EP2022/063876 mailed Oct. 13, 2023.
(Continued)

*Primary Examiner* — Octavia Hollington
*Assistant Examiner* — Monica S Young
(74) *Attorney, Agent, or Firm* — Lempia Summerfield Katz LLC

(57) ABSTRACT

A system and a method for analyzing the motions of a mechanical structure. The System includes (a) accelerometers provided as standard accelerometers to measurement-points of the mechanical structure, (b) at least three accelerometers provided as reference accelerometers to measurement-points of the mechanical structure, (c) at least one shaker being attached to the mechanical structure for moving the structure periodically within a first frequency range, and at least one data processing system being configured to: (d) receiving measurements from the accelerometers at the measurement-points when periodically moving the structure within the first frequency range by the at least one shaker. To provide accurate and quick calibration the at least one data processing system is further configured to calibrate the accelerometers' positions and orientations by the following steps: (e) determining from the measurements of the at least three reference accelerometers rigid body motions, (f) determining positions and orientations of reference accelerometers from the rigid body motions, and (g)

(Continued)

determining positions and orientations of standard accelerometers from the rigid body motions.

18 Claims, 2 Drawing Sheets

(58) Field of Classification Search
USPC .................................................... 702/85, 49
See application file for complete search history.

(56) References Cited

U.S. PATENT DOCUMENTS

2011/0048103 A1   3/2011   Su
2012/0191397 A1   7/2012   Eatwell

OTHER PUBLICATIONS

International Search Report for International App. PCT/EP2022/063876 mailed Sep. 8, 2022.
International Search Report for International App. PCT/EP2022!063876 mailed Sep. 9, 2022.
Schopp, Patrick, et al. "Self-calibration of accelerometer arrays." IEEE Transactions on Instrumentation and Measurement 65.8 (2016): 1913-1925.
Tcherniak, Dmitri, and Manuel Schwaab. "On a method for finding position and orientation of accelerometers from their signals." Mechanical Systems and Signal Processing 140 (2020): 106662.

\* cited by examiner

SYSTEM AND A METHOD FOR ANALYZING THE MOTIONS OF A MECHANICAL STRUCTURE

CROSS REFERENCE TO RELATED APPLICATIONS

The present patent document is a § 371 nationalization of PCT Application Serial Number PCT/EP2022/063876, filed May 23, 2022, designating the United States which is hereby incorporated in its entirety by reference. This patent document also claims the benefit of EP21181864 filed on Jun. 25, 2021, which is hereby incorporated in its entirety by reference.

FIELD

Embodiments relate to a system and a method for analyzing the motions of a mechanical structure.

BACKGROUND

The disclosure should not be interpreted as a proof any aspects mentioned herein belonging to public disclosure respectively to prior art. To conventionally analyze the motions of mechanical structures it is known that the structure is instrumented with accelerometers. The orientations and positions of the latter need to be measured and documented, but this is a time-consuming, tedious, and error-prone manual process. Each of the accelerometers applied to such a structure may be at nontrivial angles, may be hard to reach but needs accurate measurements of coordinates and orientations. A normal setup may include several 100s of such sensors.

Whereas more established analysis techniques like Modal Analysis do not require high precision for this geometry information, more modern analysis techniques (FBS, TPA) have far higher demands on accuracy.

At present, techniques are under investigation to use measurements from the sensors themselves to compute orientations and positions from rigid-body motions of the mechanical structure. But these techniques suffer from several problems:

The excitation of the mechanical structure needs to encompass all 6 potential degrees of freedom of the structure, but there are no tools available to ascertain this.

There might be inaccuracies in the measurement sensors themselves (such as calibration errors, oblique angles).

The mathematical problem to find orientations and positions is formulated as a nonlinear, non-convex optimization problem. Basically, this means that solvers for such problems will be 'shooting in the dark' and might end up with sub-optimal solutions. Furthermore, it would be difficult to tell whether the errors on the solution are due to finding a local optimum, or rather due to incomplete or noisy inputs.

From Dmitri Tcherniak [(Brüel & Kjær Sound & Vibration Measurement A/S), "Can one find the position and orientation of accelerometers from their signals?", Proceedings of ISMA 2020 (2020 Leuven Conference on Noise and Vibration Engineering, virtual event), Leuven, Belgium, Sep. 7-9, 2020] a procedure is known to cope with uncertainties in the alignment of the sensors.

The publications WO 2019/224277 A1 and Schopp Patrick et al: "Self-Calibration of Accelerometer Arrays", IEEE TRANSACTIONS ON INSTRUMENTATION AND MEASUREMENT, IEEE, USA, vol. 65, no. 8, 1 Aug. 2016 (2016-08-01), pages 1913-1925, XP011616597, ISSN: 0018-9456, DOI: 10.1109/TIM.2016.2549758 deal respectively at least in part with the idea to deduce the orientations and positions from preliminary measurements.

The above referenced procedure and algorithms from Dmitri Tcherniak may be summarized as follows:

Step 1.: Structure excitation. In this step, Tcherniak et al. suggest moving the structure long enough in all 6 rigid body motion patterns. Tcherniak et al. suggest keeping the excitation at low frequencies and/or to filter the acquired data through a low-pass filter, to suppress motion patterns where the structure is deformed by the excitation.

Problems in this process step are identified to be that: there is no criterion for sufficient long shaking that sufficiently accurate information in all 6 rigid body motions is obtained. At the end the user needs to speculate and see whether the end results make any sense, deformations will never be totally absent (albeit not dominant). This results in noise passing through the low-pass filter due to structure deformations.

Step 2.: Extracting rotations and translations. In this step, each time sample is turned into an immediate rotational/translational acceleration pair. Each of these pairs will be used as separate nonlinear equations in the subsequent step. One problem in this process step is identified to be that there are often points in time with immediate accelerations close to 0, yielding equations that consist of little more than noise.

Step 3.: Computing the orientations and positions of non-reference accelerometers is done by using a generic constrained nonlinear optimizer (SQP) [see: https://en.wikipedia.org/wiki/Sequential_quadratic_programming] to solve the set of nonlinear equations from the previous step. This approach is unstable for the following reasons:

SQP is an iterative algorithm, not guaranteed to converge, and certainly not safe to reach a global optimum. SQP uses gradient-based searching so is likely to end up in a local instead of a global optimum. Gradient-based nonlinear optimizers can theoretically find global minima, but only if the target function is convex. But given the nature of Euler angles, this is unlikely. As a result, the accuracy of the result can barely be determined. The only information about accuracy is given by the residue of the target function. The process does not teach a solution if it ends up in a local minimum with an unacceptable large residue.

The performance is uncertain, too, since there is no way of telling how long the solver computation will take to reach convergence (if ever).

More information provided as input in the process results in larger time consumption of each iteration. Tcherniak et al. have modeled the relative orientation of the unknown accelerometers using Euler angles (see: https://en.wikipedia.org/wiki/Euler_angles). Whereas Euler angles are very common in this engineering domain, Tcherniak et al. are mathematically extremely awkward: Angles are inherently ambiguous respectively aliased, i.e. a 375-degree rotation equals a 15 degree rotation. Even if one disregards angle aliasing, Euler angles are ambiguous, i.e. two completely different sets of Euler angles can result in the same rotation e.g. (the combination [180, 180, 180] is the same as [0, 0, 0]). This is proof that the target function of the SQP algorithm has to be non-convex. This conclusion may be explained by way of an example: if [0,0,0] is a solution for some accelerometer, then [180, 180, 180] has the same value for the target function and anything in between (e.g. [10, 10, 10]) is not a solution. This proves non-convexity of the target function by definition.

The relationship between a rotation matrix and Euler angles is highly nonlinear. On top of this, the equations in question have terms where the rotation matrix is multiplied with the positions, both of which are unknown, adding yet another layer of nonlinearity. The idea of modeling a local-to-global coordinate system using Euler angles makes some assumptions that might not be true in reality: this approach is based on the assumption that the local coordinate system of a triaxial accelerometer is accurately orthogonal, whereas this is subject to production errors; further, it assumes that all accelerometers have exact calibration values, whereas the calibration procedure for accelerometers is tedious and often skipped prior to a measurement campaign; Tcherniak et al. use a constrained nonlinear optimizer but such physical constraints seem to be absent in this problem. Tcherniak et al. may require a confined search space for their variables, e.g. to get a decent starting value for their iterations. But initial coordinates like (0,0,0) and orientations like (0,0,0) are accepted starting points just the same. From the above explanation it seems that these constraints are there to make sure that the algorithm does not diverge ("run away" in space). Tcherniak et al. indicates that coordinates would be limited to the room containing the structure, but this constraint seems to be not sufficient. The paper indicates limits on the Euler angles (e.g. restrict values to [0, 360) degrees) to avoid the angle aliasing problems.

As an example, the exact solution may be 15 degrees. The gradient of the SQP method will probably point in the direction of 375 (=15) degrees then since this is closest to the current 359. But due to the constraints, the iterations cannot break through the artificial wall to reach 375. The iterations will also not follow the gradient in the opposite direction. This results in an end error on this angle of at least 15 degrees.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a globally optimal solution, and with a clear separation between identifying the quality of the input data and the identification of positions and orientations. Embodiments further cope with inaccuracies in the sensors, too.

To provide accurate and quick calibration, embodiments provide a system and method of the incipiently defined type. The at least one data processing system is further configured to calibrate the accelerometers' positions and orientations by the following steps: (e) determining from the measurements of the at least three reference accelerometers rigid body motions and (f) determining positions and orientations of accelerometers from the rigid body motions.

One embodiment may provide that step (e) further includes: (e1) providing a reference-measurement-matrix composed of the measurements from the at least three reference accelerometers, (e2) determining from the reference-measurement-matrix the rigid body motions as singular values and the accompanying singular vectors by single value decomposition.

This feature provides fast and systematic processing of singular values and vectors using standard algorithm respectively modules resulting in quick determination of rigid body motion patterns.

An alternative embodiment provides that step (e) further includes: (e1) providing a reference-measurement-matrix composed of the measurements from the at least three reference accelerometers, (e2) determining from the reference-measurement-matrix the rigid body motions as singular values and the accompanying singular vectors by single value decomposition.

This feature speeds up processing of singular values and vectors.

According to another embodiment step (e) may further include a sub-step as: (e3) comparing the resulting singular values with a predefined singular value lowest threshold and repeating steps (c), (d), (e) in case that the six biggest resulting singular values are smaller than the singular value lowest threshold.

The comparison with the singular-value-lowest-threshold ensures sufficient excitation of the structure by the shaker to provide accurate determination of the rigid body motion. The repetition of steps (c), (d), (e) may be done in several loops to avoid on the one hand vibration excitation involving deformation (modes of the structure) and on the other hand to low singular values possibly leading to inaccuracies. The starting excitation may therefore be done with a low frequency and/or low amplitude and may be stepwise raised to reach the singular-value-lowest-threshold. All these steps are computer-implemented.

Step (f) further includes: (f1) decomposing the 6 rigid body motions applying an infinitesimal rotation model into six infinitesimal rigid body translation-rotation pairs by solving a resulting set of linear equations using a solver, (f2) linearly recombining the six infinitesimal rigid body translation-rotation pairs into three pure translations, (f3) deriving orientations of accelerometers from the three pure translations, (f4) deriving positions of accelerometers from the 6 rigid body motions.

Another embodiment provides that the solver is configured to apply the least-squares-method or the Moore-Penrose-pseudo-inverse-method.

Another embodiment provides that the system or method according to the above explanations further includes step (g) in turn including the following steps: (g1) providing a standard-measurement-matrix composed of the measurements from the standard accelerometers, (g2) applying the linear combinations of the single value decomposition of step (e2) to standard-measurement-matrix to obtain compatibility with the singular vectors, (g3) linearly recombining the standard-measurement-matrix to match the rigid body motions, using the left singular vectors of the single value decomposition as a transformation matrix.

Single value SVL decomposition SVD is a well-defined mathematical concept and is a factorization of a real or complex matrix that generalizes the eigen decomposition.

$$U\Sigma V^T = A^r$$

The singular value decomposition of an m×n complex matrix $A^r$ is a factorization of the form $U\Sigma V^T$ where U is a m×m complex unitary matrix, $\Sigma$ is an m×n rectangular diagonal matrix with non-negative real numbers on the diagonal, and $V^T$ is a n×n complex unitary matrix. The diagonal entries of 2 are known as the singular values of $A^r$. The number of non-zero singular values is equal to the rank of $A^r$. The columns of U and the columns of $V^T$ are called the left-singular vectors and right-singular vectors of $A^r$, respectively, more details may be found under https://en.wikipedia.org/wiki/Singular_value_decomposition Another embodiment provides that step (g) may still further include: (g4) deducing a local-to-global-coordinates transformation matrix of each standard accelerometer by solving linear equations as: (absolute acceleration)=[transformation matrix]×(local accelerations), (g5) transforming the orientations of the accelerometers' measurements by the transformation matrix, and that step (g) may still further include: (g6) determining the positions of the accelerometers' by applying an infinitesimal rotation model and solving linear equations for each accelerometer resulting from the rigid body motions.

Another embodiment provides that the first frequency range is such a low-frequency that the accelerometers are sufficiently accurate and none of the structural vibration modes of the structure are excited.

BRIEF DESCRIPTION OF THE DRAWINGS

Embodiments are herein described, by way of example only, with reference to the accompanying drawings, of which.

The illustration in the drawings is in schematic form. It is noted that in different figures, similar or identical elements may be provided with the same reference signs.

DETAILED DESCRIPTION

Although the embodiments are described in detail with reference to various embodiment, it is to be understood that the embodiments are not limited by the disclosed examples, and that numerous additional modifications and variations could be made thereto by a person skilled in the art without departing from the scope.

The use of "a" or "an" throughout this application does not exclude a plurality, and "including" does not exclude other steps or elements. Also, elements described in association with different embodiments may be combined. It should also be noted that reference signs in the claims should not be construed as limiting the scope of the claims.

Figure 1:
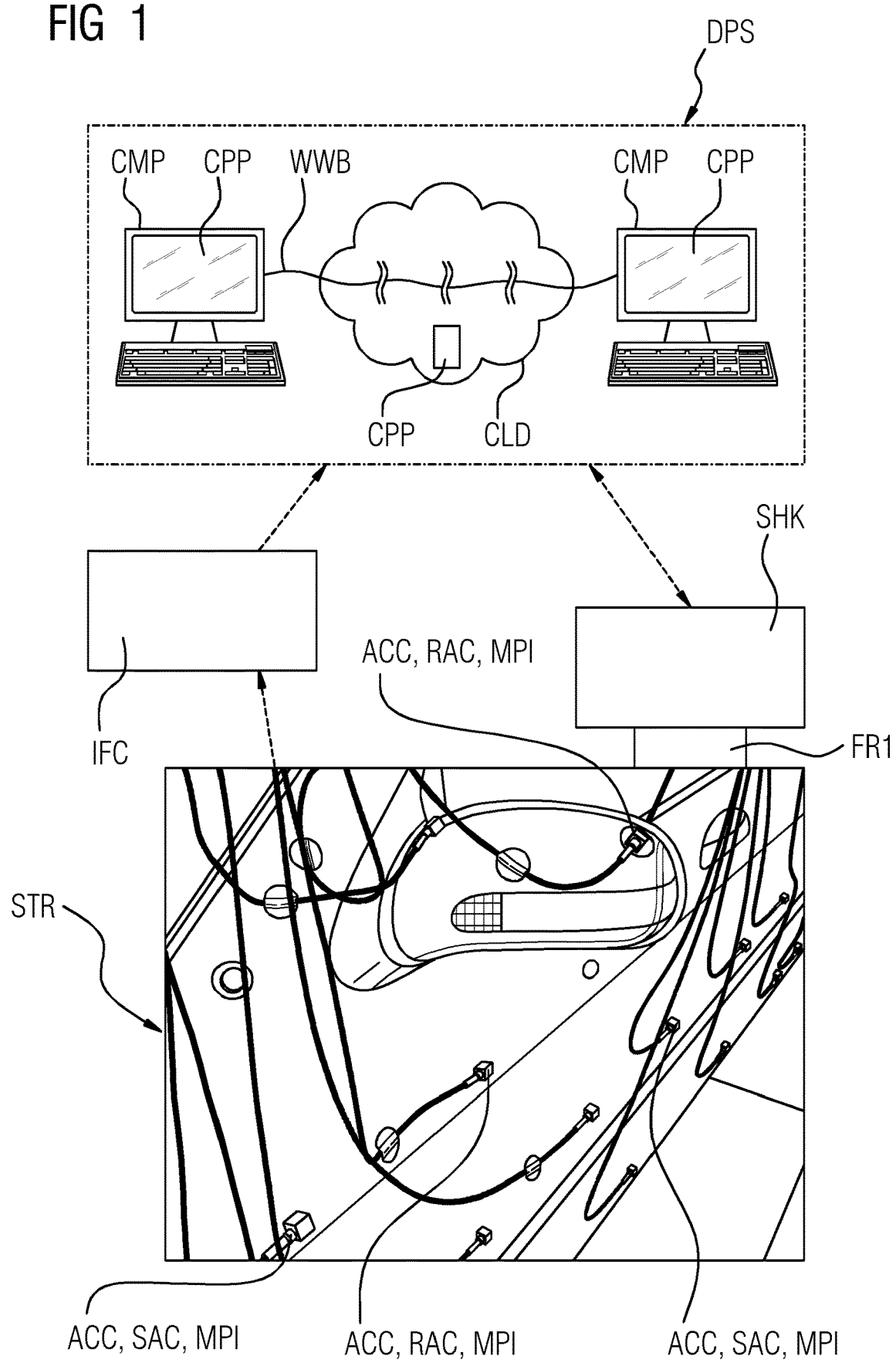
FIG. 1 depicts a simplified schematic illustration of a system for analyzing the motions of a mechanical structure by applying the method according to an embodiment.

FIG. 1 depicts a simplified system setup according to an embodiment. FIG. 1 depicts a system SYS for analyzing motions of the mechanical structure STR. The system includes accelerometers ACC which are attached to the mechanical structure STR at measurement-points MPI. Some of the accelerometers ACC are provided as standard accelerometers SAC and others are provided as reference accelerometers RAC. The reference accelerometers RAC are attached to measurement points MPI being remote to each other on the structure STR, for example on the outer edge(s) of the structure STR. At least three reference accelerometers RAC are to be provided to the mechanical structure STR and are to be arranged not-collinearly.

The accelerometers ACC are connected to an interface IFC that is connected to a data processing system DPS. The connection between the accelerometers ACC and the interface IFC is illustrated simplified where the interface IFC indeed is connected to every single accelerometers ACC, receives the data generated, normally changes the data format (e.g., an Outlook/digital), and provides the changed measurement data to the data processing system DPS. The data processing system may include one or several computers CMP—here on several computers CMP of a network WWB including a cloud CLD. The software installed on the computer(s) CMP is a computer program product CPP which, when executed on at least one computer CMP, provides the user to carry out the method respectively to calibrate the accelerometers' ACC positions and orientations. Further, the system SYS and, for example, the data processing system DPS provides to carry out the analysis of the motions of the mechanical structure STR, for example, after the calibration. Each of the—maybe several hundred—accelerometers ACC may be arranged at nontrivial angles, may be hard to reach but conventionally needs accurate measurements of position-coordinates and orientations.

Figure 2:
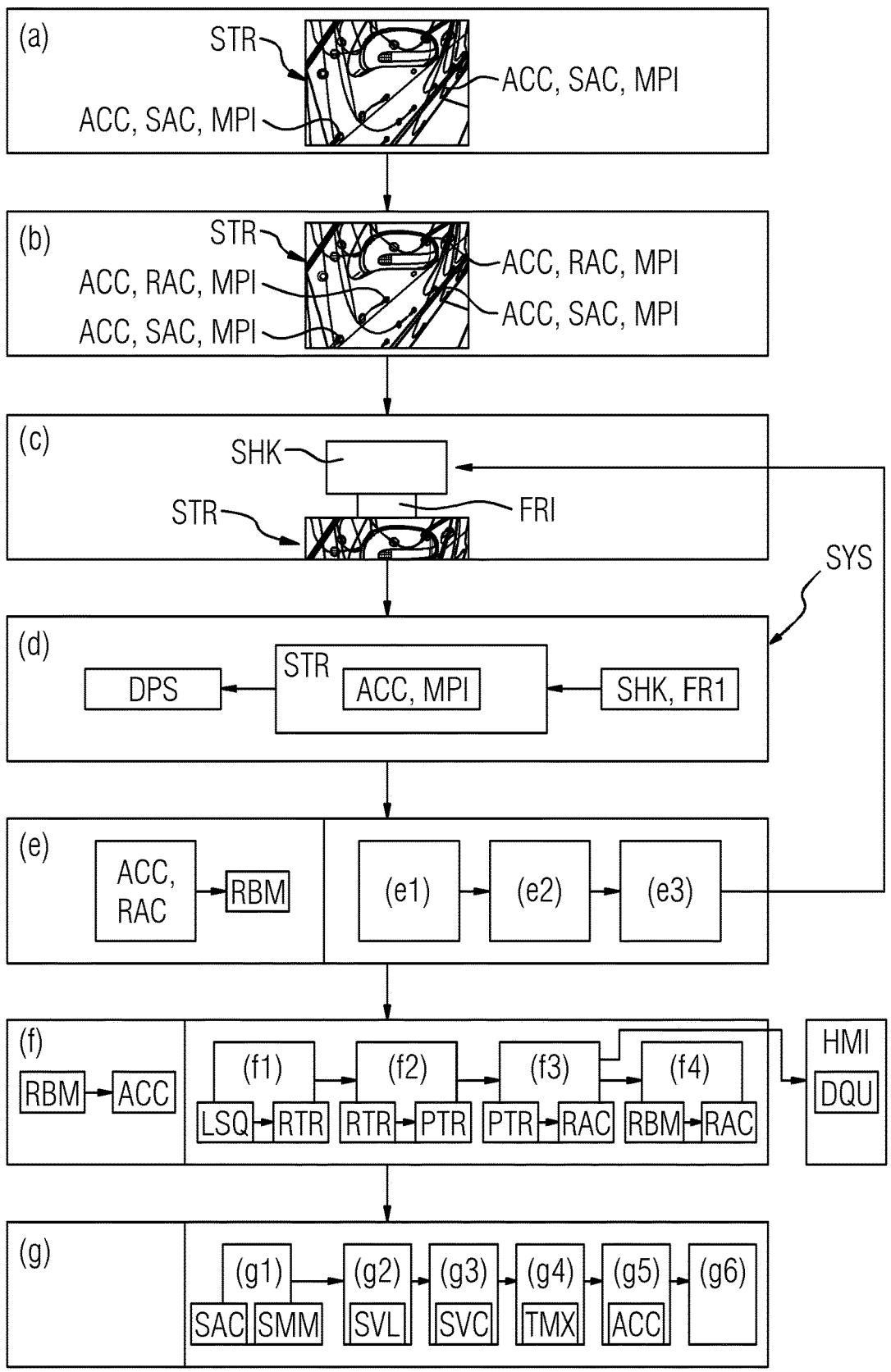
FIG. 2 depicts a schematical flow diagram of a method according to an embodiment.

FIG. 2 depicts a simplified flow diagram illustrating the method according to an embodiment. This method illustrated is for calibrating a system SYS as illustrated in FIG. 1. In step (a) accelerometers ACC are provided as standard accelerometers SAC to measurement-points MPI of the mechanical structure STR. In STEP (b) at least three accelerometers ACC are provided as reference accelerometers RAC. During STEP (c) at least one shaker SHK is attached to the mechanical structure STR for moving the structure STR periodically within a first frequency range FR1. The order of the STEPS (a), (b), (c) is arbitrary and a person with ordinary skill in the art understands that these steps can be carried out in any sequence.

As soon as this basic hardware setup of STEPS (a), (b), (c) is done STEP (d) of receiving measurements from the accelerometers ACC at the measurement points MPI when periodically moving the structure STR within the first frequency range FR1 by the shaker SHK may be performed. These measurements are received by the data processing system DPS STEPS (e), (f), (g) predominantly refer to the preparation of the data processing system DPS to calibrate the accelerometers' ACC positions and orientations and therefore include algorithmic features requiring the following definitions:

| variable | definition |
|---|---|
| $i: 0 \ldots n_i$ | Ordinal of a triax accelerometer in either stage A or B (depends on context) |
| $n_{iA}$ | Number of Stage A triax accelerometers |
| $n_{iB}$ | Number of Stage B triax accelerometers |
| $j: 0 \ldots n_j$ | Ordinal of time samples measured at a low frequency (or down-sampled) |
| $k: 0 \ldots n_k$ | Ordinal of a rigid body motion. $n_k = 6$. |
| $\vec{p}_i$ | Static position of accelerometer i |
| $\vec{a}_{ij}^r$ | Amplitude of relative acceleration (in local coordinate system) measured by accelerometer i in the j'th sample. |
| $A^r$ | Matrix containing a row for each time sample, and three columns (x,y,z) per triax accelerometer, containing the time samples of each relative acceleration. |
| $\vec{a}_{ik}^r$ | Amplitude of relative acceleration (in local coordinate system) measured by accelerometer i in rigid body motion k. This vector can be 1-dimensional, 2-dimensional or 3-dimensional, depending on single, dual or triax instrumentation. |
| $A_i^r$ | $3 \times n_k$ matrix containing $\vec{a}_{ik}^r$ as columns with i fixed. |
| $\vec{a}_{ik}^a$ | Amplitude of absolute acceleration measured by accelerometer i in rigid body motion k. Always a 3-dimensional vector. |
| $A_i^a$ | $3 \times n_k$ matrix containing $\vec{a}_{ik}^a$ as columns with i fixed. |
| $A_k^a$ | $3 \times n_i$ matrix containing $\vec{a}_{ik}^a$ as columns with k fixed. |
| $E_i$ | $3 \times 3$ matrix that transforms relative acceleration vectors in the coordinate system of $\vec{p}_i$ into absolute acceleration vectors. In the appendix, this matrix has 1 to 3 columns and 3 rows, depending on whether the instrumentation is single, dual or triax respectively. The matrix will typically be close to orthogonal, but calibration and skewness errors in the triax accelerometers can result in non-orthogonality. |
| $\vec{x}_{ik}$ | displacement of accelerometer i in rigid body motion k (in absolute coordinate system, but relative to $\vec{p}_i$ |
| $\vec{t}_k$ | Translation of the body for rigid body motion k |

-continued

| variable | definition |
|---|---|
| T | $3 \times 6$ matrix containing $\vec{\ddot{t}}_k$ as columns |
| variable | definition |
| $\vec{r}_k$ | Rodrigues rotation vector for rigid body motion k |
| R | $3 \times 6$ matrix containing $\vec{r}_k$ as columns |
| $[\vec{v}]_x$ | Matrix that does the linear transformation such that $[\vec{v}]_x \vec{w} = \vec{v} \times \vec{w}$. This matrix is singular:<br>* if $\vec{v}$ is zero, then any nonzero vector is mapped to zero.<br>* If $\vec{v}$ is nonzero, then the nonzero vector $\vec{v}$ is mapped to zero (since $\vec{v} \times \vec{v} = 0$). |

Before explaining STEPS (e), (f), (g) some introductory remarks are given below.

For infinitesimal rotations around a rotation axis—small rotations—the rotational motion $(x\_i)^{\rightarrow}$ may be approximated as a cross product with the Rodrigues vector that describes the rotation (e.g. https://en.wikipedia.org/wiki/Rodrigues%27_rotation_formula). This may be written as a rotation around a Rodrigues vector with unit direction $\vec{k}$ and magnitude θ expressed as a matrix multiplication with matrix R defined as:

$$R = I + (\sin\theta)[\vec{k}]_x + (1-\cos\theta)[\vec{k}]_x^2 \quad (1)$$

a point $\vec{p}_i$ may rotate to $R\vec{p}_i$ such that rotational motion $\vec{x}_i$ can be computed as:

$$\vec{x}_i = R\vec{p}_i - \vec{p}_i = (R-I)\vec{p}_i$$

Substitution of eq. (1) yields:

$$\vec{x}_i = [\sin\theta[\vec{k}]_x + (1-\cos\theta)[\vec{k}]_x^2]\vec{p}_i$$

Differentiating twice results in the accelerations:

$$\vec{x}_i = [\sin\theta[\vec{k}]_x + (1-\cos\theta)[\vec{k}]_x^2]\vec{p}_i$$

$$\dot{\vec{x}}_i = [\cos\theta\dot\theta[\vec{k}]_x + \sin\theta\dot\theta[\vec{k}]_x^2]\vec{p}_i$$

$$\ddot{\vec{x}}_i = [(-\sin\theta\dot\theta^2 + \cos\theta\ddot\theta)[\vec{k}]_x + (\cos\theta\dot\theta^2 + \sin\theta\ddot\theta)[\vec{k}]_x^2]\vec{p}_i$$

For small rotations θ this can be approximated (e.g. using a Taylor series of sin and cos truncated to 1st degree) as:

$$\ddot{\vec{x}}_i \approx [\ddot\theta[\vec{k}]_x + \dot\theta^2[\vec{k}]_x^2]\vec{p}_i$$

This is the sum of respectively a tangential and radial (=centripetal) acceleration component. The radial acceleration will vanish to zero for small rotations because of the square in $\dot\theta^2$. This may be illustrated by assuming a sinusoidal rotation with infinitesimally small amplitude: $\theta = \theta_0 \sin\phi$ with $\theta_0$ very small. Then:

$$\dot\theta = \theta_0 \cos\phi \dot\phi$$

$$\dot\theta^2 = \theta_0^2 \cos^2\phi \dot\phi^2$$

$$\ddot\theta = \theta_0(-\sin\phi\dot\phi + \cos\phi\ddot\phi)$$

For low frequencies and small $\theta_0$, $\dot\theta^2$ will vanish against $\ddot\theta$.

With the radial component vanished, the approximation may be written as:

$$\ddot{\vec{x}}_i \approx \ddot\theta[\vec{k}]_x \vec{p}_i$$

With the direction of rotation assumed constant, this is equivalent to:

$$\ddot{\vec{x}}_i \approx [\ddot\theta \vec{k}]_x \vec{p}_i = [\vec{\ddot{r}}]_x \vec{p}_i$$

STEP (e) of the method provides determining rigid body motions RBM from the measurements of the at least three reference accelerometers RAC. This may be done as follows. STEP (e) may be done stepwise to extract 6 independent rigid body motions from the time data of the measurements. These steps may include STEPS (e1), (e2) and STEP (e3).

With all acceleration samples re-arranged in the matrix Ar, Singular Value Decomposition may be applied to the measurements, yielding:

$$U\Sigma V^T = A^r$$

Since all possible motions are a linear combination of rigid body rotations and translations, and there are only 6 degrees of freedom, the rank of Ar cannot be higher than 6.

If the rank is less than 6 not all rigid body motions were excited by the shaker SHK. This would require repetition of STEPS (c), (d) to obtain sufficient excitation. This loop may be repeated with stepwise increasing the frequency or amplitude of the excitation as long until sufficient excitation is guaranteed.

The right singular vectors of $A^r$ belong to the biggest six singular values and therefore hold six independent acceleration patterns. These singular values and their vectors dominating all others represent six independent rigid body motions. The first six columns of V may be called V'.

Since V' is a 3 ni×6 matrix column k may be rearranged into a 3×ni matrix Ark including the relative vector accelerations of all triax accelerometers of the k'th experiment.

Alternatively, each group of 3 rows (3i . . . 3i+2) may be sliced into a 3×6 matrix Ari holding the relative vector accelerations of all experiments of the i'th triax accelerometer.

These columns are independent, and they are also orthogonal to each other, which provides an additional filtering effect against intrusion of deformation modes. Indeed, deformation modes tend to alternate more (i.e. deformations will change direction over space more frequently) than rigid body motions. Since this effect is only approximative it cannot be successfully applied in completely suppressing deformation modes.

The matrix Ar may be rather sizable and single value decomposition SVD may take a long time.

As an alternative to this approach an embodiment provides that:

STEP (e1) may be carried out as: providing a reference-measurement-matrix RMM composed of the measurements from the at least three reference accelerometers RAC, and that STEP (e2) may therefore performed as: determining from the reference-measurement-matrix RMM the rigid body motions RBM as singular values SVL and the accompanying singular vectors SVC by single value decomposition SVD.

Accordingly, the single value decomposition SVD may be performed using only the measurements of the reference accelerometers RAC. When 3 reference triax accelerometers are used, the maximal rank of Ar may be reduced to 9, resulting in a huge speed-up for the single value decomposition SVD. This alternative may be used in case of low probability of deformation since this alternative does not benefit from the filtering effect due to orthogonality in the same magnitude.

As a STEP (e1) a slice $A^{r,A}$ of matrix $A^r$ may be composed, containing only the columns of reference accelerometers RAC.

For easier notation, it is assumed that the reference accelerometers RAC precede the standard accelerometers SAC in the columns of A. Hence:

$$A^r = [A^{rA} | A^{rB}] \text{ will be a } nj \times 3ni \text{ matrix.}$$

As a STEP (e2) the single value decomposition SVD on $A^{rA}$ may be applied, yielding $U^A \Sigma^A V^{AT} = A^{rA}$. Assuming that nj is bigger than 3 niA:
$U^A$ is a nj×nj orthogonal matrix
$\Sigma^A$ is a nj×3 niA left submatrix of a nj×nj diagonal matrix
$V^A$ is a 3 niA×3 niA orthogonal matrix.

For example—as a STEP (e3)—a check may be performed whether $\Sigma^A$ has 6 sufficiently dominant singular values SVL. As long as this is not the case, additional excitation may be performed (repeating STEPS (c), (d), (e) and potentially involving additional shakers SHK).

Continuing STEP (e2) six dominant singular values SVL are determined, the six left singular vectors with the biggest singular values SVL from UA into U'A as columns may be extracted. U' A is a nj×6 matrix.

Multiplying the left Ar with U'AT, yielding $$U'^{AT}A^r = [U'^{AT}A^{rA} | U'^{AT}A^{rB}]$$

Here, six different linear combinations of the time samples have been taken. As the rigid body motions RBM are linear at an infinitesimal scale, any linear combination is a valid rigid body motion RBM, too. $U'^{AT} A^r$ has rank 6.

Having determined from the measurements (maybe only by the at least three reference accelerometers RAC) rigid body motions RBM the next STEP (f) is performed. This step may be carried out stepwise (f1), (f2), (f3), (f4).

From the previous STEP (e) six independent rigid body motion RBM accelerations $\vec{a}_{ik}^r$ for all measurement points MPI were obtained, including reference accelerometers RAC. Since the orientations of reference accelerometers RAC are known from STEP (e), the absolute accelerations of all reference accelerometers RAC may be obtained:

$$\vec{a}_{ik}^a = E_i \vec{a}_{ik}^r$$

STEP (f1) provides decomposing the six rigid body motions RBM applying an infinitesimal rotation model into six infinitesimal rigid body translation-rotation pairs RTR by solving a resulting set of linear equations using a solver LSQ.

Embodiments make use of the fact that for translational accelerations, the respective acceleration is identical for all measurement points MPI.

The acceleration of a measurement points MPI, here point pi in the k'th rigid body motion RBM is a combination of a small position-dependent rotational acceleration and a small position-independent translational acceleration:

$$\vec{a}_{ik}^a = \vec{x}_{ik} \approx \vec{r}_k \times \vec{p}_i + \vec{t}_k$$

This may be a basis to compute the unknowns $\vec{r}_k$ and $\vec{t}_k$ for all 6 independent rigid body motion RBM.

Equation (10) is linear in both $\vec{r}_k$ and $\vec{t}_k$ and may possibly be overdetermined, yielding to:

$$\vec{a}_{ik}^a = \vec{r}_k \times \vec{p}_i + \vec{t}_k$$

$$\vec{a}_{ik}^a = -\vec{p}_i \times \vec{r}_k + \vec{t}_k$$

$$\vec{a}_{ik}^a = -[\vec{p}_i]_x \vec{r}_k + \vec{t}_k$$

This may be expressed as a matrix equation:

$$A_k^a = \begin{bmatrix} \vec{a}_{0k}^a \\ \vec{a}_{1k}^a \\ \vdots \end{bmatrix}$$

$$B_k = \begin{bmatrix} -[\vec{p}_0]_x & I_3 \\ -[\vec{p}_1]_x & I_3 \\ \vdots & \end{bmatrix}$$

$$X_k = \begin{bmatrix} \vec{r}_k \\ \vec{t}_k \end{bmatrix}$$

Which can be solved by the solver LSQ using least-squares or Moore-Penrose pseudo-inverse:

$$A_k^a = B_k X_k$$

$$B_k^+ A_k^a = X_k$$

The rank of Bk needs to be six to have a unique solution. In order for the solution to be unique, the three measurement points MPI of the reference accelerometers RAC must be arranged non-collinearly (STEP (b)). More reference measurement points MPI than three are possible and may increase the accuracy but are not strictly necessary to guarantee a unique solution.

At that stage, when the rotation axes for each measurement and frequency line are known, the positions and orientations may be derived.

Using the same equations as above, the unknowns and the known variables are now exchanged, meaning that pi and Ei are now unknown.

$$\vec{a}_{ik}^a \approx \vec{r}_k \times \vec{p}_i + \vec{t}_k$$

In matrix notation, combining for all 6 possible values of k, this may be expressed as:

$$A_i^a = -[\vec{p}_i]_x R + T$$

In STEP (f2) the six infinitesimal rigid body translation-rotation pairs RTR are linearly recombined into three pure translations PTR. Relative accelerations may be translated into absolute accelerations through the unknown transformation matrix Ei:

$$\vec{a}_{ik}^a = E_i \vec{a}_{ik}^r$$

In matrix form:

$$A_i^a = E_i A_i^r$$

Combining with equation (19) results in:

$$E_i A_i^r = -[\vec{p}_i]_x R + T$$

Z may be a matrix holding the null space of R. Z has at least 3 independent columns since R is a 3×6 matrix.

If all rotational degrees of freedom are available in the measurements of the accelerometers ACC Z has not more than 3 columns in the null space—so Z is a regular 3×3 matrix for which:

$$RZ = 0$$

The null space Z may be computed using a full single value decomposition SVD on R and taking the 3 right singular vectors with the lowest singular values SVL.

Post-multiplying eq. 22 with Z yields:

$$E_i A_i^r Z = -[\vec{p}_i]_x RZ + TZ$$

Due to associativity of the matrix product, the first right hand term vanishes due to RZ=0:

$$E_i A_i^r Z = TZ$$

It is important to notice that TZ represents the 3 pure translations extracted from the 6 rigid body motions RBM.

In STEP (f3) orientations of reference accelerometers ACC are derived from three pure translations PTR.

During the accelerometer ACC measurement 6 independent rigid body motions RBM are identified. This will result in three independent pure translations PTR. Moreover, since Ei is (close to) an orthogonal matrix, it is rank 3. If the rank of Ei and TZ is both 3, then $A_i^r Z$ will have rank 3. Hence, matrix inversion is possible, yielding:

$$E_i = TZ(A_i^r Z)^{-1}$$

According to an embodiment, the fact that the matrix Ei is orthogonal may be used as a measure for the quality of the data. The data processing system DPS may calculate an orthogonality index being a measure for data quality DQU and output this information, e.g. display this information through a human machine interface HMI to an operator. The resultant matrix could easily be forced to be orthogonal, but it may also be used to check orientation respectively orthogonality of any transducer mount.

The lengths of the vectors in Ei might not equal 1 because of improper calibration. According to another embodiment, the accuracy of the rigid body motions RBM may be improved by using estimated Ei to transform the deflections from the local coordinate system to the global coordinate system. This may also make calibration of the standard accelerometers SAC superfluous.

STEP (f4) provides deriving positions of accelerometers ACC from the 6 rigid body motions RBM.

Once Ei is known, the absolute accelerations in all standard accelerometer SAC measurement points MPI may be determined as:

$$\vec{a}_{ik}^a \approx \vec{r}_k \times \vec{p}_i + \vec{t}_k$$

This may be converted into an over-determined set of linear equations in pi:

$$\vec{a}_{ik}^a - \vec{t}_k \approx [\vec{r}_k]_x \vec{p}_i$$

pi may not be computed from a single equation because $[\vec{r}_k]_x$ is singular. Having at least two independent Rodrigues rotation vectors, sufficient information is available because the null spaces of each $[\vec{r}_k]_x$ correspond to the Rodrigues vectors themselves, and they are not collinear but are independent.

The solution can be computed using least-squares or Moore-Penrose pseudo-inverse.

STEP (g) may be carried out stepwise as STEPS (g1), (g2), (g3) and for example further including at least one of the STEPS (g4), (g5), (g6).

In STEP (g1) a standard-measurement-matrix SMM composed of the measurements from the standard accelerometers SAC may be provided.

(g2) applying the linear combinations of the single value SVL decomposition SVD of STEP (e2) to standard-measurement-matrix SMM to obtain compatibility with the singular vectors SVC.

(g3) linearly recombining the standard-measurement-matrix SMM to match the rigid body motions, using the left singular vectors of the single value SVL decomposition SVD as a transformation matrix.

STEP (g) may further include the steps: (g4) deducing a local-to-global-coordinates transformation matrix TMX of each standard accelerometer SAC by solving linear equations as: (absolute acceleration)=[transformation matrix (TMX)]×(local accelerations), (g5) transforming the orientations of the accelerometers' ACC measurements by the transformation matrix TMX, (g6) determining the positions of the accelerometers' ACC by applying an infinitesimal rotation model and solving linear equations for each accelerometer ACC resulting from the rigid body motions RBM.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A System for analyzing the motions of a mechanical structure, the system comprising:
    a plurality of standard accelerometers configured to measurement-points of the mechanical structure;
    at least three reference accelerometers configured to measurement-points of the mechanical structure;
    at least one shaker attached to the mechanical structure for moving the structure periodically within a first frequency range; and
    at least one data processing system configured to:
    receive measurements from the at least three reference accelerometers at the measurement-points when periodically moving the mechanical structure within the first frequency range by the at least one shaker and
    calibrate the positions and orientations of the plurality of standard accelerometers by the following steps:
    determining from the measurements of the at least three reference accelerometers rigid body motions,
    determining positions and orientations of the plurality of standard accelerometers from the rigid body motions, wherein determining positions and orientations further comprises:
        decomposing the 6 rigid body motions applying an infinitesimal rotation model into six infinitesimal rigid body translation-rotation pairs by solving a resulting set of linear equations using a solver,
        linearly recombining said six infinitesimal rigid body translation-rotation pairs into three pure translations,
        deriving orientations of the plurality of standard accelerometers from the three pure translations, and
        deriving positions of the plurality of standard accelerometers from the 6 rigid body motions.

2. The System of claim 1, wherein determining the rigid body motions further comprises:
    providing a measurement-matrix composed of the measurements from the plurality of standard accelerometers; and determining from the measurement-matrix the rigid body motions as singular values and the accompanying singular vectors by single value decomposition.

3. The System of claim 2 further comprising:
comparing the resulting singular values with a predefined singular value lowest threshold and repeating steps moving, measuring, and determining when the six biggest resulting singular values are smaller than the singular value lowest threshold.

4. The System of claim 2, further comprising:
providing a standard-measurement-matrix composed of the measurements from the plurality of standard accelerometers;
applying the linear combinations of the single value decomposition to standard-measurement-matrix to obtain compatibility with the singular vectors; and
linearly recombining the standard-measurement-matrix to match the rigid body motions, using the left singular vectors of the single value decomposition as a transformation matrix.

5. The System of claim 4, further comprising:
deducing a local-to-global-coordinates transformation matrix of each standard accelerometer by solving linear equations as:

(absolute acceleration)=(transformation matrix)×(local accelerations); and transforming the orientations of the plurality of standard accelerometers' measurements by the transformation matrix.

6. The System of claim 5, further comprising:
determining the positions of the plurality of standard accelerometers' by applying an infinitesimal rotation model and solving linear equations for each standard accelerometer resulting from the rigid body motions.

7. The System of claim 1, wherein determining the rigid body motions further comprises:
providing a reference-measurement-matrix composed of the measurements from the at least three reference accelerometers; and
determining from the reference-measurement-matrix the rigid body motions as singular values and the accompanying singular vectors by single value decomposition.

8. The System of claim 1 wherein the solver is configured to apply the least-squares-method or the Moore-Penrose-pseudo-inverse-method.

9. The System of claim 1,
wherein the first frequency range is such a low frequency that the plurality of standard accelerometers are sufficiently accurate and none of the structural vibration modes of the mechanical structure are excited.

10. A method for calibrating a system for analyzing the motions of a mechanical structure the system comprising:
providing a plurality of standard accelerometers attached to measurement points of the mechanical structure;
providing at least three reference accelerometers attached to measurement points not arranged in a collinear pattern;
periodically moving the mechanical structure within a first frequency range;
measuring the motions at the measurement points by the at least three reference accelerometers;
determining from the measurements of the at least three reference accelerometers rigid body motions;
determining positions and orientations of the plurality of standard accelerometers from the rigid body motions, wherein determining positions and orientations further comprises:
decomposing the six rigid body motions applying an infinitesimal rotation model into six infinitesimal rigid body translation-rotation pairs by solving a resulting set of linear equations using a solver;
linearly recombining the six infinitesimal rigid body translation-rotation pairs into three pure translations;
deriving the orientations of the plurality of standard accelerometers from the three pure translations; and
deriving the positions of the plurality of standard accelerometers from the six rigid body motions.

11. The method of claim 10, wherein determining the rigid body motions further comprises:
providing a measurement-matrix composed of the measurements from the plurality of standard accelerometers; and
determining from the measurement-matrix the rigid body motions as singular values and the accompanying singular vectors by single value decomposition.

12. The method of claim 11, further comprising:
comparing the resulting singular values with a predefined singular value lowest threshold and repeating steps moving, measuring, and determining when the six biggest resulting singular values are smaller than the singular value lowest threshold.

13. The method of claim 11, further comprising:
providing a standard-measurement-matrix composed of the measurements from the plurality of standard accelerometers;
applying the linear combinations of the single value decomposition to standard-measurement-matrix to obtain compatibility with the singular vectors; and
linearly recombining the standard-measurement-matrix to match the rigid body motions, using the left singular vectors of the single value decomposition as a transformation matrix.

14. The method of claim 13, further comprising:
deducing a local-to-global-coordinates transformation matrix of each standard accelerometer by solving linear equations as:

(absolute acceleration)=(transformation matrix)×(local accelerations); and transforming the orientations of the plurality of standard accelerometers' measurements by the transformation matrix.

15. The method of claim 14, further comprising:
determining the positions of the plurality of standard accelerometers' by applying an infinitesimal rotation model and solving linear equations for each standard accelerometer resulting from the rigid body motions.

16. The method of claim 10, wherein determining the rigid body motions further comprises:
providing a reference-measurement-matrix composed of the measurements from the at least three reference accelerometers; and
determining from the reference-measurement-matrix the rigid body motions as singular values and the accompanying singular vectors by single value decomposition.

17. The method of claim 10, wherein the solver is configured to apply the least-squares-method or the Moore-Penrose-pseudo-inverse-method.

18. The method of claim 10, wherein the first frequency range is such a low frequency that the plurality of standard accelerometers are sufficiently accurate and none of the structural vibration modes of the mechanical structure are excited.

* * * * *